No. 830,134. PATENTED SEPT. 4, 1906.
J. H. COOK.
WIRE CABLE CLAMP.
APPLICATION FILED MAY 7, 1904.
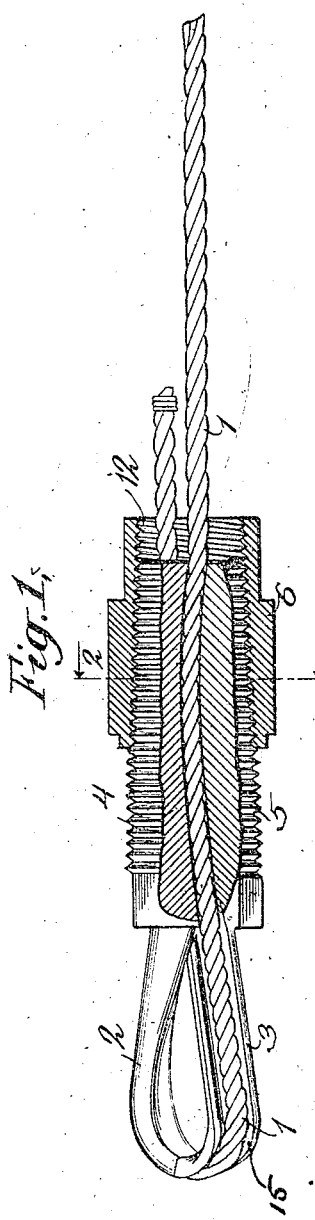
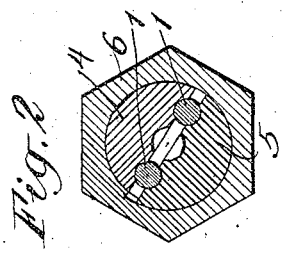
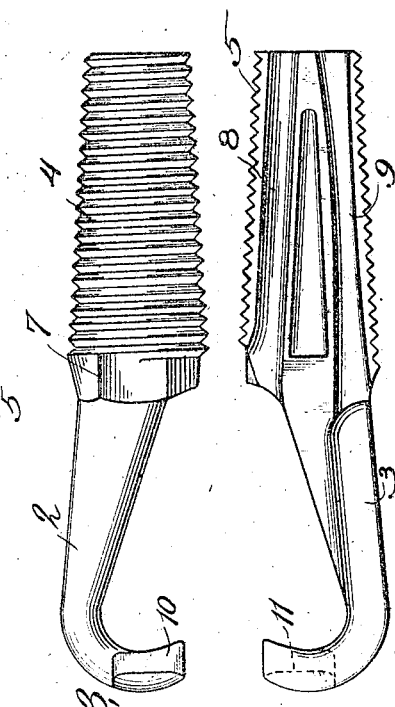
WITNESSES:
John H Cook  INVENTOR
BY
Duncan & Duncan  ATTORNEYS

UNITED STATES PATENT OFFICE.

JOHN H. COOK, OF NEW YORK, N. Y., ASSIGNOR TO HENRY B. NEWHALL, OF PLAINFIELD, NEW JERSEY.

WIRE-CABLE CLAMP.

No. 830,134.　　　Specification of Letters Patent.　　　Patented Sept. 4, 1906.

Application filed May 7, 1904. Serial No. 206,932.

*To all whom it may concern:*

Be it known that I, JOHN H. COOK, a citizen of the United States, and a resident of the borough of Brooklyn, city of New York, county of Kings, and State of New York, have invented certain new and useful Improvements in Wire-Cable Clamps, of which the following is a specification, taken in connection with the accompanying drawings, which form a part of the same.

This invention relates to clamps, and relates especially to clamps such as may be used for connecting cables of wire or similar material and for securing the ends of such cables.

In the accompanying drawings, illustrating an embodiment of this invention, Figure 1 is a partial longitudinal sectional view. Fig. 2 is a transverse sectional view taken substantially on the line 2 2 of Fig. 1. Fig. 3 represents the two clamping members as separated.

In the illustrated embodiment of this invention a plurality of tapering threaded clamping members are indicated as being engaged by a threaded sleeve which forces them together and clamps the cable between them, a suitable thimble being formed by the projecting thimble-arms secured to the clamping members. The two coöperating clamping members 4 and 5 shown in the drawings are threaded externally and are preferably given a tapering or conical form. These two clamp members are preferably given at one end a polygonal form 7, which may be engaged by a wrench and may act as a nut in rotating the members. The two coöperating faces of these clamp members are preferably formed with grooves of varying depth throughout the various parts of the clamp, so that when assembled the two members form the curved cable-grooves, (indicated in Fig. 1,) the two grooves 8 and 9 preferably curving in different directions and, if desired, these grooves may be formed with suitable gripping projections or corrugations to assist in engaging the cable, as is indicated in Fig. 1. By forming the two grooves at an angle to each other, as is indicated in Fig. 3, their surfaces are located substantially parallel to the taper of the clamp members, and, furthermore, a loop is more readily formed in the cable in this manner at the larger end of the members.

The sleeve 6 is shown as provided with the tapering threaded bore 12 to engage the tapering clamp members, and this sleeve may be formed with the sleeve-nut indicated for readily rotating the same with respect to the members. In this manner a very powerful pressure can be exerted by the members upon the cable inserted in the grooves by reason of the combined wedging and screw action of the parts of the clamp, and, furthermore, the parts of the clamp may be readily and quickly applied.

Suitable thimble-arms 2 and 3 are rigidly secured to the clamp members, so as to be integral therewith, although the use of these thimble-arms is not necessary in all cases. As indicated, these thimble-arms 2 and 3 are formed integral with the clamp members by casting or otherwise, and these coöperating arms form a thimble when the clamp is assembled, a suitable groove 15 being of course provided, in which the cable is guided. The outer ends of the thimble-arms are formed with suitable coöperating beveled ends 10 and 11, which overlap to form a better support, though these coöperating members 10 and 11 may be omitted. The extremities of these thimble-arms are preferably formed square and engage corresponding square recesses, so that the lateral displacement of these arms is prevented, the extent to which the ends of the thimble-arms can be forced together being limited by the engagement of these square ends and shoulders.

In using this clamp for securing cables in telegraph-work, for ships'-rigging, or for hoisting or other purposes the two clamp members may be arranged about the looped end of a cable which is inserted through the sleeve, the loop of the cable being adjusted about the thimble so as to properly engage the groove therein. Then by screwing the sleeve upon the tapering clamp members to the desired extent the proper clamping action is secured by forcing these two coöperating members together in a powerful manner. By forming the thimble integral with the clamp members themselves a more rigid support is given to the loop of the cable and the accidental displacement of the thimble is positively prevented, and, furthermore, the device has fewer parts and can be more readily and certainly assembled.

Having thus described this invention in connection with an illustrative embodiment thereof, to the details of which I do not desire to be limited except in so far as required by the scope of the appended claims, what is claimed as new, and what is desired to be secured by Letters Patent, is set forth in the appened claims.

1. In clamps, two clamp members formed with a plurality of coöperating curved grooves extending throughout the length of the members, one end of each of said members forming a nut for rotating the members, a sleeve formed with a nut and having a tapering threaded bore to engage said members to force the same together, each of said members having a grooved thimble-arm secured thereto, the ends of said arms being formed with tapered portions and with square ends and shoulders to support the loop of a cable held by said members.

2. In clamps, two tapered threaded clamping members formed with coöperating grooves in their adjacent faces and each member formed with a thimble-arm secured thereto, the said thimble-arms when brought together adapted to form a continuous support for the loop of a cable held between said tapered members and a threaded nut to engage said members to force them together.

3. In clamps, tapered threaded clamping members formed with coöperating grooves in their adjacent faces to form a plurality of grooves substantially in the plane of said adjacent faces, an open-grooved thimble-support formed on said members and extending forward from said members to support in open position the loop of a cable and a threaded sleeve to engage said members.

4. In clamps, two clamping members each formed with a plurality of coöperating curved grooves, each of said members having a grooved thimble-arm secured thereto and coöperating with the curved grooves in the faces of said clamp members, the ends of said arms being formed with square ends and shoulders to fit together and support the loop of a cable held by said members.

5. In clamps, tapered threaded clamping members formed with coöperating grooves in their adjacent faces, a threaded sleeve to engage said members to force them together, and an integral grooved thimble-arm formed on each of said members to support an open attaching-loop in the cable held by said members.

6. In clamps, tapered threaded clamping members formed with coöperating grooves in their adjacent faces, a thimble-support formed on said members extending forward from said members to support the loop of a cable held by said members and a threaded sleeve to engage said members.

7. In clamps, coöperating clamping members formed with coöperating grooves in their adjacent faces, integral thimble-arms formed on said members and extending forward from said members to support the loop of a cable held by said members and means to force said clamping members together.

8. In clamps, tapered threaded clamping members formed with coöperating grooves in their adjacent faces, a threaded sleeve to engage said members to hold them together an integral thimble-arm secured to each member to support an open attaching-loop in the cable held by said members.

JOHN H. COOK.

Witnesses:
HARRY L. DUNCAN,
JESSIE B. KAY.